Feb. 18, 1936.  H. B. BARRETT  2,031,357
COMBINATION PRECISION GRINDER AND CALIPERS
Filed July 10, 1933  2 Sheets-Sheet 1
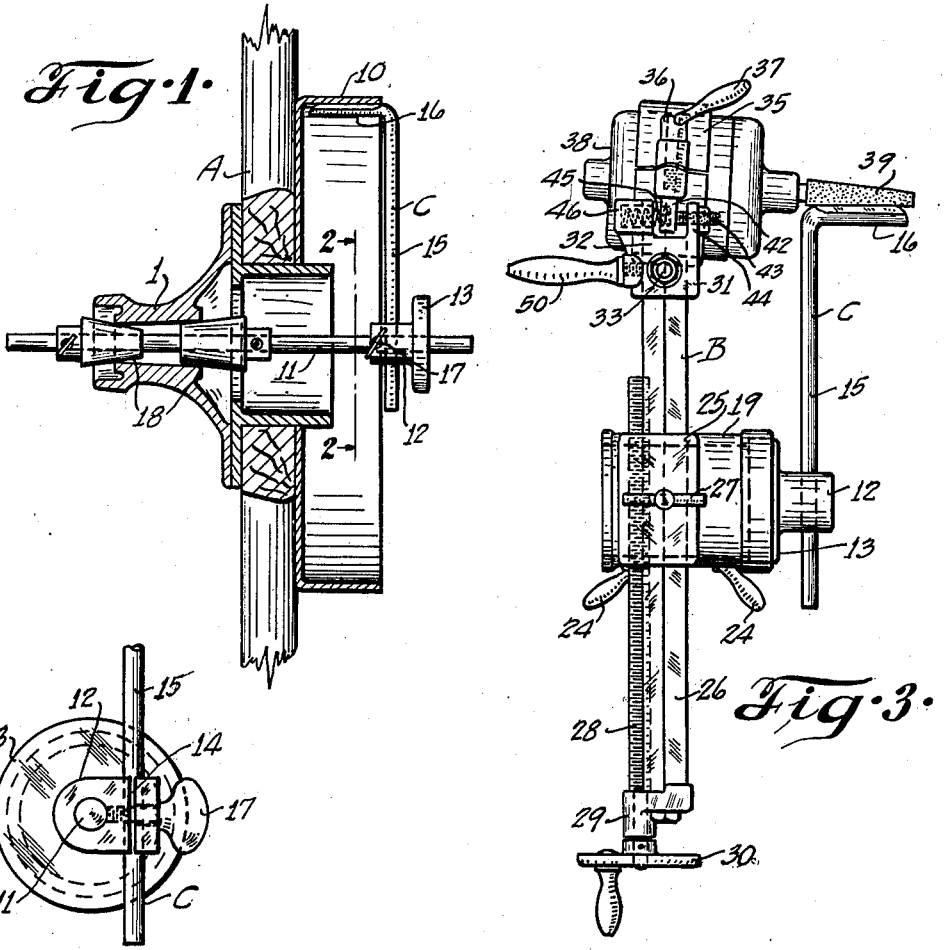
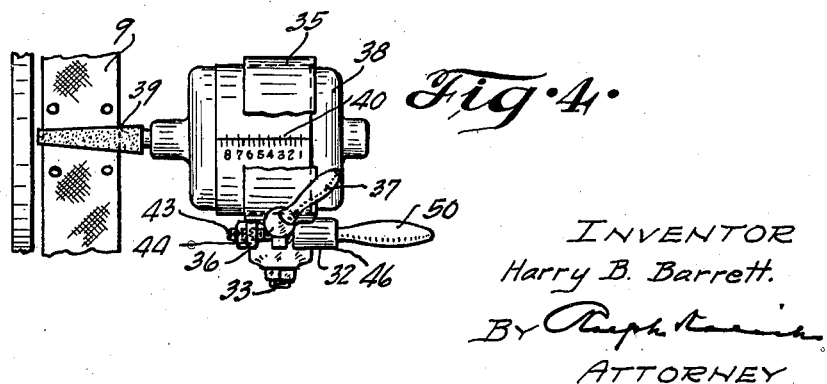
INVENTOR
Harry B. Barrett.
ATTORNEY Feb. 18, 1936. H. B. BARRETT 2,031,357
COMBINATION PRECISION GRINDER AND CALIPERS
Filed July 10, 1933 2 Sheets-Sheet 2

INVENTOR
Harry B. Barrett.
BY
ATTORNEY

Patented Feb. 18, 1936

2,031,357

UNITED STATES PATENT OFFICE 2,031,357

COMBINATION PRECISION GRINDER AND CALIPERS

Harry B. Barrett, Los Angeles, Calif.

Application July 10, 1933, Serial No. 679,697

9 Claims. (Cl. 51—241)

This invention relates generally to tools and devices for grinding cylindrical surfaces and, more particularly, to a certain new and useful improvement in tools or devices especially, though not exclusively, adapted for the grinding of the linings of brake-shoes and the like.

Automobile brakes usually comprise cylindrical drums rigidly fixed to the wheels and expandible and contractible shoes suitably co-operably mounted pivotally with respect to the drums for applying braking pressure to the drums and hence also to the wheels. For applying such pressure, the shoes are lined with suitable fabric or other friction material, such as asbestos strips, and for obtaining the maximum of braking efficiency, it is essential that the shoes not only be accurately positioned, but also that the respective drum-engaging faces of the linings have precise and accurate curvature relatively to the cylindrical faces of the respective drums.

My present invention has hence for its chief object the provision of a portable tool that may be readily mounted operatively with respect to the particular brake-shoe and its lining or other work, and which is conveniently operable for grinding the brake-shoe linings to conform precisely and accurately with the radial dimension of their companion drums for obtaining the desired maximum braking efficiency.

My invention has for another object the provision of a grinding-tool having a relatively wide range of radial axial, and angular adjustments for accurately disposing the abrading-member of the tool for effecting the desired grinding operations.

My invention has for still another object the provision of a grinding-tool of the type and for the purposes stated which may be also utilized with facility as a caliper in setting the lining-ground shoes to the desired drum-clearance for effective braking operations.

My invention has for a further object the provision of a combined tool of the class mentioned which may be economically manufactured, which is compact and durable, and which is exceedingly efficient in the performance of its intended functions.

And with the above and other objects in view, my invention resides in the novel features of form, construction, arrangement, and combination of parts presently described and pointed out in the claims.

In the accompanying drawings,—

Figure 1 is a diametrical sectional view of a wheel-hub and its attached drum, illustrating the use of a caliper associated with my new grinding-tool for obtaining the precise radial dimension of the drum;

Figure 2 is an end-view of the drum-caliper taken approximately on the line 2—2, Figure 1;

Figure 3 is a side elevational view of the grinding-tool of my invention, illustrating also the transference of the radial dimension of the drum to the tool-parts.

Figure 4 is a partly broken top plan view of the tool in operative relation to a fragmentally shown brake-shoe lining;

Figure 5:
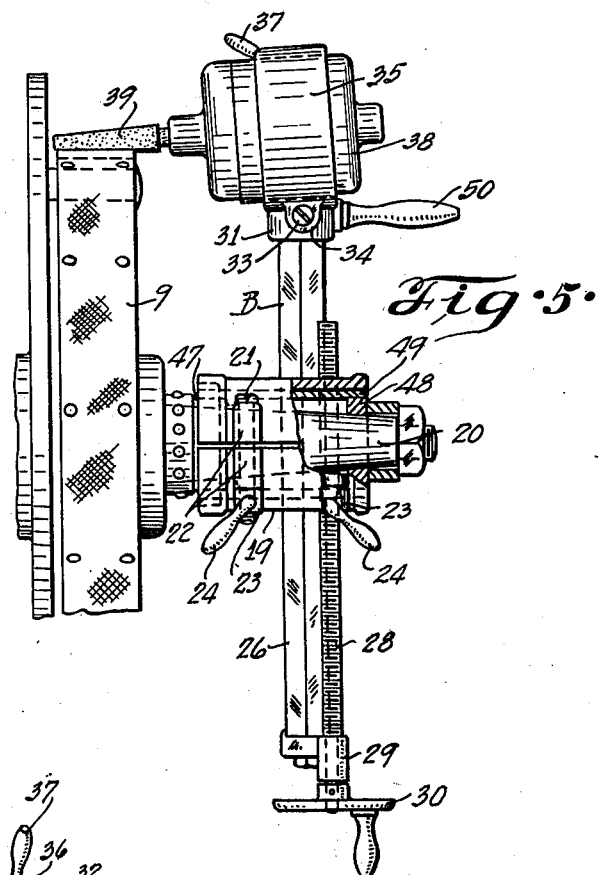
Figure 5 is a side view, partly broken away and in section, of the tool in mounted grinding relation to an automobile-wheel axle and an associated brake-shoe lining.

Referring now more in detail and by reference characters to the drawings, which illustrate a preferred embodiment of the tool, A designates a standard automobile-wheel having the usual axle-receiving hub 1. Suitably adjustably pivoted at an end, as at 2, on the axle-assembly, as will be understood, are opposed brake-shoes 3, in the present instance of the internal expanding hydraulic type, pivotally connected at their other end, as at 4, to, and shiftable by, piston-rods 6 working in a cylinder 7, the shoes 3, when contracted, abutting with proper drum clearance, adjustable eccentric-anchors 8. Suitably fixed on the peripheral faces of the shoes 3, are asbestos or other suitable lining strips 9 for frictional wheel-braking engagement, when the shoes 3 are expanded, with the inner cylindrical face of the drum 10 rigidly fixed about the hub 1 on the inner face of the wheel A.

Associated with the grinding-tool proper B, presently described, for ascertaining the radial dimension of the drum 10 for subsequent adjustment of the tool-parts, is a caliper C, which includes a shaft 11, mounted upon which for slidable adjustment is a head 12 having, for purposes presently appearing, a flanged, substantially cup-shaped bearing-engaging member 13. The head 12 is suitably bored and split, as at 14, to adjustably receive and support a rod 15 provided at its outer end for drum-engagement with a right-angular arm 16, the head 12 being also equipped with a set-screw or the like 17 for both securing the gauge-rod 15 in adjusted position on the head 12 and the head 12 on the shaft 11, as best seen in Figure 2.

The shaft 11 is also equipped with suitable opposed cones 18 and, by means of the cones 18, as best seen in Figure 1, may be rigidly mounted in and centrally of the hub 1, when the gauge-rod 15 may, for the purposes stated, be manipulated to ascertain, through the lateral arm 16, the precise, accurate radial dimension of the inner face of the drum 10.

The tool proper B comprises a bearing-member in the form preferably of a barrel 19 for mounting of the tool for oscillatory movement for lining-grinding purposes on the wheel-axle 20, and it may be stated that for enabling convenient mounting and securing of the barrel 19 detachably on the axle 20, the barrel 19, as shown, is preferably of split-type and provided with suitable diametrically expanding and contracting means including cap-screws 21 mounted in registering pairs of ears 22 on the barrel 19 and nuts 23 shiftable on the screws 21 by manipulation of swingable levers 24. It may also be stated here that the caliper-member 13 is diametrically of a size for snugly clamping within the barrel 19.

The barrel 19 is also provided with a lateral or radial enlargement 25 suitably bored for slidably receiving a frame in the form preferably of a single bar 26 preferably of non-circular cross-section, a set-screw 27 being thread-seated in the enlargement 25 for engaging the bar 26 for securing the barrel 19 in adjusted position thereon.

The barrel-enlargement 25 is also formed transversely with a threaded bore for adjustable engagement with an endless screw 28 extending substantially parallel with, and mounted for rotation at an end in a bearing-member 29 provided on, the bar 26, the screw-shaft 28 being provided for convenient adjustment purposes with a handwheel or other suitable crank 30, as shown.

Suitably fixed on the end of the bar or frame 26 opposite the hand-wheel 30, is a sleeve or collar 31 formed with an upwardly presented yoke 32, and disposed transversely in the sleeve 31, is a pivot-pin 33, on which, by means of a projecting ear 34, is mounted a motor-bearing in the form preferably of a split-collar or band 35 equipped with expanding and contracting means 36 substantially similar to the described expanding and contracting means of the bearing or barrel 19 and likewise including a manipulator-lever 37.

Disposed, and by means of the lever 37 and its associated parts adjustably clamped, within the bearing 35, is an electric-motor or other prime-mover 38 adapted for connection with any suitable source of current-supply, and suitably renewably mounted on and supported by the shaft of motor 38, is an abrading-member preferably in the form of a conical rasp 39, as best seen in Figures 3, 4, and 5.

Figure 6:
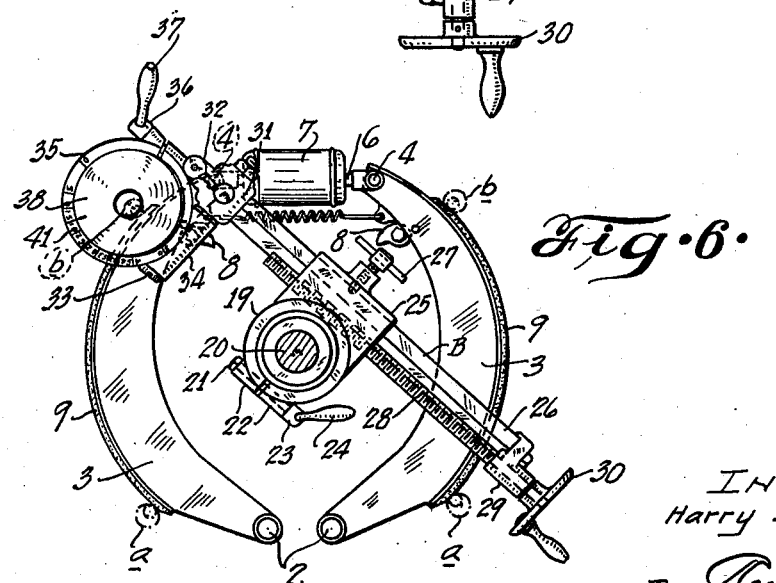
Figure 6 is illustrative of the tool, on a reduced scale, as in use as a caliper or measuring instrument for obtaining the proper or desired clearance between the shoes and their co-operable drum for efficient braking engagement.

As best also seen in Figure 4, the motor 38 is transversely equipped with a scale or graduations, as at 40, for adjustably locating the abrader 39 longitudinally with respect to the work, as more fully presently appearing, and it is to be noted that, as best seen in Figure 6, while the inner face of the bearing 35 is perfectly or entirely cylindrical, the outer arcuate face of the housing of the motor 38 is somewhat out of round, so that, when the motor 38 is rotatably shifted in the bearing or band 35 from normal or zero position, the abrader 39 will be correspondingly disposed eccentrically with respect to the bearing 35. Rotatory adjustment of the motor 38 within and relatively to the bearing 35, facilitated by the described conveniently operable band expanding and contracting means, will accordingly vary the length of the radius-arm of the tool, that is to say, the radial distance between the abrader 39 and the center of the bearing or barrel 19. To accurately and precisely gauge such eccentric or angular adjustments of the motor 38, for purposes presently appearing, the bearing 35 is marginally equipped with an annular scale or calibrations, as at 41, and it will be evident that, upon manipulation of the screw-shaft 28, the frame or bar 26 and its supported motor 38 will be correspondingly moved or shifted from or toward the bearing or barrel 19 for varying the radial distance therebetween.

As best seen in Figure 3, the motor-bearing 35 is provided with a finger 42, which depends in the bight of the yoke 32 for impinging a stop-screw 43 adjustably threaded in the one yoke-leg 44, a coiled spring 45 seated in the opposite yoke-leg 46 yieldingly urging the finger 42 in engagement with the stop 43.

Now, in use or operation, the shoes 3 are arranged, as has been stated, for braking co-operation with the drum 10, and the linings 9 are to be ground and the shoes 3 adjustably set with proper clearance for obtaining the maximum braking efficiency. The radius of the drum 10 is first obtained as described by means of the caliper C. The caliper C is then detached from the wheel A, and its cup-shaped member 13 disposed and clamped within the bearing 19, as best seen in Figure 3. By means then of the wheel or crank 30, set-screw 27 being released, the screw-shaft 28 is rotatably actuated and the bar 26 and supported motor 38 correspondingly shifting for engaging the abrader 39 with the gauge arm 16, as also shown in Figure 3. Thus the radius of the drum 10 is precisely transferred to the tool B, and as a conical abrader is preferable for efficiently meeting the working conditions presented in the limited space about the axle-assembly, the stop-screw 43 is suitably adjusted so that the motor 38 may be tiltably swung to dispose the tapering peripheral or grinding face of the abrader 39 in parallelism with the gauge-arm 16, as further best seen in Figure 3. In such adjustment, it will also be understood that the motor 38 may be shifted longitudinally in the bearing 35 and then clamped at a precise position determined on the scale 40, so that the abrader 39, in engaging the work, that is to say, a lining 9, will project and extend completely, and thereby in subsequent operation make a clean cut entirely, thereacross.

Such adjustments being made, the caliper C is removed and the barrel 19 mounted for rotatory or oscillatory actuation on the particular axle. In the present instance, the axle 20 is of the tapering type, and hence suitable bearing adapters are conveniently employed. In the present instance and as here shown, such adapters comprise spaced cone-rings 47, 48, having like outer diameters, but varying inner diameters so as to snugly fit at spaced points on the axle 20, superposed on which and about the axle 20 is a cylindrical bushing 49 on which the bearing 19 is sleeved. It will, of course, be understood that other types of adapters may be equally well employed as the conditions of any wheel assembly may present for mounting the tool for rotatory actuation with respect to the work, the barrel 19 being readily clamped upon, or released for removal from, the bushing 49 on corresponding manipulation of the expanding and contracting levers 24. By means then of an operating-handle 50, the tool B may be conveniently oscillatably shifted and the face of the particular linings 9, through the rotating and correspondingly shifted abrader 39, ground to accurately and precisely conform from end to end, when the shoes 3 are expanded, with the co-operable engaging face of the drum 10.

The grinding operation being completed and running of the motor 38 being discontinued, the anchoring pivots 2 are loosened and the anchoring cams 8 released. The clearance requirements of the particular brake-assembly being known, the motor 38 is rotatably shifted to, and clamped within, the bearing 35 at the precise eccentric location, determined by the calibrations 41, for heel clearance. The tool B is then disposed in turn with respect to the shoes 3 adjacent the heels thereof, as at a, a, Figure 6, and the anchoring pins 2 locked for maintaining the shoe-heels, when the shoes are contracted, in corresponding spaced or cleared position from the drum 10.

In a like manner, the motor 38 is shifted to, and clamped within, the bearing 35 at the precise eccentric location, again determined by the calibrations 41, for toe-clearance. The tool B is then disposed in turn with respect to the shoes 3 adjacent the toes thereof, as at b, b, Figure 6, and the cams 8 locked for similarly maintaining the shoe-toes, when the shoes are contracted, in corresponding spaced or cleared position from the drum 10.

Both shoes 3 are thus set to the same, exact clearance desired, so that, when expanded, both shoes 3 engage the drum 10 with approximate equal braking pressure.

Thus the tool B is adapted not only for precisely grinding the linings 9 to smoothly engage throughout their area the face of the mounted drum 10, but also, upon completion of such operation, for precisely locating the brake-shoes 3 with proper normal drum-clearance, both at heel and toe, for, when expanded, tightly and uniformly engaging the drum.

The tool is simple and light in construction and also is adapted to easily and accurately grind the brake linings with the exercise of a minimum degree of skill by the operator. When the bearing 19 is mounted upon an automobile front axle, which is usually fully cylindrical and not tapered, a suitable bushing may be provided to take the place of the rings 47, 48. It will also be understood that the eccentric location of the abrading tool 39 with respect to the bearing 35 may be obtained by positioning the motor shaft eccentrically within its casing, in which case both the motor-casing and bearing 35 may be cylindrical.

While internal expanding brake-shoes are only here illustrated, it will be understood that the tool may be advantageously used in connection with external contracting or band type shoes. And hence it is to be further understood that various other changes and modifications in the form, construction, arrangement, and combination of the several parts of the tool may be made and substituted for those herein shown and described without departing from the nature and principle of my invention.

Having thus described my invention, what I claim and desire to secure by Letters Patent is,—

1. In a tool, a frame, means for mounting the frame for oscillation with respect to the work, a collar fixed on the frame, a motor-bearing mounted pivotally on the collar, and means comprising a yoke on the collar and a projection on the bearing working between the legs of the yoke for adjustably regulating pivoted movement of the bearing with relation to the frame.

2. In a tool, a frame, means for mounting the frame for oscillation with respect to the work, an annular bearing mounted on the frame in radially spaced relation to the mounting-means, a motor supported for rotary movement in the bearing, and an abrading-member carried for rotation by the motor, the motor including a partly out-of-round housing for adjustably locating the abrading-member radially with respect to the mounting-means.

3. In a tool, a frame, means for mounting the frame for oscillation with respect to the work, an annular bearing mounted on the frame in radially spaced relation to the mounting-means, a motor supported for rotary movement in the bearing, an abrading-member carried for rotation by the motor, the motor including a partly out-of-round housing for adjustably locating the abrading-member radially with respect to the mounting-means, and an annular gauge on the bearing for scaling the radial adjustments of the abrading-member relatively to said mounting-means.

4. In a tool, a frame, means for mounting the frame for oscillation with respect to the work, an annular bearing on the frame in radially spaced relation to the mounting-means, a motor mounted within the bearing, and an abrading-member carried for rotation by the motor, the motor being both longitudinally and rotatably shiftable with respect to said bearing for varying the location of the abrading-member with respect to the work.

5. In a tool, a bearing for mounting the tool for oscillation with respect to the work, a frame having engagement with, and longitudinally shiftable with relation to, said bearing, an annular bearing tiltably mounted on the frame in radially spaced relation to the first bearing, a motor mounted within and adjustably shiftable with respect to the second bearing, and an abrading-member carried for rotation by the motor, the motor and second bearing being also constructed for eccentric adjustment for varying the location of the abrading-member with respect to the first bearing.

6. The combination with a tool including means including a barrel for mounting the tool for oscillation on a wheel-axle, a frame having engagement for longitudinal adjustment with the barrel, and an abrading-member carried for rotation on the frame, of means including an annular member for snugly fitting within the barrel, and an adjustably spaced gauge-arm for engaging the abrading-member for correspondingly spacing the same radially from the barrel.

7. In a grinding-tool, means including a bearing for mounting the tool on a shaft for oscillation about the shaft and with respect to the work, an apertured enlargement fixed in offset relation on the bearing, a frame comprising a bar fitting lengthwise through the aperture of the enlargement with its opposite end-portions disposed upon diametrically opposite sides of the bearing, a motor and its casing mounted on and with respect to the work oscillatably with the bar, an abrading-member carried for rotation by the motor for engaging the work, and means for lengthwise shifting the bar for adjustably spacing the motor and abrading-member radially with respect to said bearing, said means including a screw-shaft mounted for rotation on the bar and having threaded engagement with the bearing.

8. In a grinding-tool, a barrel for mounting the tool on a shaft for oscillation about the shaft and with respect to the work, an apertured enlargement fixed in offset relation on the barrel, a bar mounted in the enlargement-aperture for adjustment transversely, and with its opposite end-portions disposed upon diametrically opposite sides, of the barrel, a motor and its casing mounted on and oscillatably with respect to the work with the bar, an abrading-member carried for rotation by the motor for work-engagement, and means for lengthwise shifting the bar for adjustably spacing the motor and abrading-member radially from the barrel, said means including a bearing-member on the bar and a screw-shaft mounted for rotation on said bearing-member and having threaded engagement with the barrel-enlargement.

9. In a grinding-tool, means including a bearing for mounting the tool on a shaft for oscillation about the shaft and with respect to the work, a frame comprising a bar mounted on the bearing for lengthwise adjustment, a motor-bearing on an end of the bar, a motor and its casing supported by the motor-bearing and sidewise presented to and over an end-face of the bar, and an abrading-member carried for rotation by the motor, the bar being lengthwise shiftable for radially spacing the abrading-member from, and the motor-casing being bodily rotarily adjustable within the motor-bearing for eccentrically shifting the abrading-member relatively to, the mounting, bearing and shift.

HARRY B. BARRETT.